United States Patent

[11] 3,616,366

[72] Inventors Beppino Passalenti;
 Silvio Vargiu; Ugo Nistri, all of Milan, Italy
[21] Appl. No. 888,834
[22] Filed Dec. 29, 1969
[45] Patented Oct. 26, 1971
[73] Assignee Societa Italiaya Resine S.p.A.
 Milan, Italy
[32] Priority Dec. 31, 1968
[33] Italy
[31] 25745 A/68

[54] PHOTOCEHMICALLY HARDENABLE UNSATURATED POLYESTER COMPOSITIONS CONTAINING A NOVEL STABILIZER SYSTEM
 9 Claims, No Drawings
[52] U.S. Cl. .................................................. 204/159.15,
 204/159.24, 260/45.9 R, 260/864, 260/865
[51] Int. Cl. ...................................................... C08d 1/00,
 C08f 1/00
[50] Field of Search .......................................... 260/45.7 P;
 204/159.15

[56] References Cited
 UNITED STATES PATENTS
 3,475,371 10/1969 Stewart et al. ................ 260/45.7 R
 3,474,071 10/1969 Byers et al. ................... 260/45.7

*Primary Examiner*—Murray Tillman
*Assistant Examiner*—Richard B. Turer
*Attorney*—Sughrue, Rothwell, Mion, Zinn & Macpeak ABSTRACT: Stable, photochemically hardenable unsaturated polyester compositions containing an alkyl or aryl phosphite, a quaternary ammonium compound and an organic sulphonyl halide.

PHOTOCEHMICALLY HARDENABLE UNSATURATED POLYESTER COMPOSITIONS CONTAINING A NOVEL STABILIZER SYSTEM

The present invention relates to unsaturated polyester compositions that can be hardened photochemically and to a suitable method of preparing them. "Polyester compositions," as used here, means combinations of monomers of acrylic or vinyl type with substances obtained by the poly condensation of polycarboxylic acids with polyhydroxyl alcohols when a nonaromatic unsaturation exists in one or the other of these classes of compounds.

As is well known, unsaturated monomers or combinations of these with unsaturated polymers can be polymerized photochemically in the presence of substances which decompose when exposed to radiation.

Among the substances decomposed by light and suitable for use for the said purpose, the following may be mentioned: carbonyl compounds containing a halogen bonded to the carbon in the alpha position with respect to the carbonyl group, mercaptans halogenated in the alpha position, nitroso compounds and the like. However, such compounds do not produce entirely satisfactory results in the photochemically hardening of compositions containing unsaturated polyesters composed of a monomer of the acryl or vinyl type in combination with a polycondensation product of the kind notes above.

The result may therefore be products that are imperfectly hardened or inferior in color in addition to which the addition of light-sensitive compounds often renders the unsaturated polyester unstable, so that the shelf life is necessarily short.

It has now been discovered that it is possible to obtain compositions containing unsaturated polyesters which are stable when stored for long periods and which harden photochemically to produce well-hardened goods, free from discoloration. These compositions, provided according to the present invention, contain an unsaturated polyester, a stabilizing system composed of organic phosphites and quaternary ammonium slats and one or more compounds that decompose under the action of light, consisting of organic sulphonyl halides. Such compositions are hardened by the action of light without the application of heat and in the absence of peroxide compounds; moreover, they do not require, for hardening, any prior separation of the stabilizing system.

The compositions here proposed also harden in air without the protective action of paraffins or paraffin waxes such as commonly used in the present state of the art, though it is normally preferable to employ such substances.

Unsaturated polyesters that can be used for the purposes of the present invention are those which, as already stated, consist of an acrylic or vinyl-type monomer in combination with a polycondensation product obtained from polycarboxlic acids and polyhydroxyl alcohols when a nonaromatic unsaturation is present in one or other of these classes of compounds. What are normally used are aryl vinyl compounds and in particular styrene, in combination with the polycondensation product obtained from saturated dihydroxyl alcohols and unsaturated dicarboxylic acids, such as, for example, maleic, fumaric, itaconic and citraconic acids.

Use may also be made, for the purposes of the present invention, of the modified substances obtained by the addition, during poly condensation, of small quantities of monocarboxylic acids or monohydroxyl alcohols or of acids having more than two carboxyl groups to the molecule or alcohols having more than two hydroxyl groups to the molecule.

Finally, the unsaturated carboxylic acids mentioned above may be partially replaced by equivalent amounts of saturated dicarboxylic acids such as, for example, succinic, adipic, azelaic or phthalic acids.

In the unsaturated polyester, the quantity of acrylic or vinyl monomer should preferably be between 20 and 70 percent by weight, preferably styrene.

The characteristics of the polyesters preferably used in the present invention lie within the following ranges;

Viscosity in cps. at 25° C.: from 600 to 1,200 and preferably for 600 to 800; acid No. (dry); from 30 to 50 and preferably from 35 to 45.

The amount of phosphite stabilizing compounds present in the unsaturated polyester compositions is between 100 and 1,000 p.p.m. for preference.

Of the organic phosphites suitable for the purposes of the present invention, preference is given to alkyl phosphites such as, for example, trimethyl phosphite and triethyl phosphite, and aryl phosphites, such as, for example, triphenyl phosphite.

The stabilizing system also contains, as noted, ammonium compounds, that is to say compounds of the type:

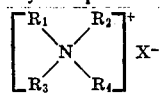

which $R_1$, $R_2$, $R_3$ and $R_4$ comprise alkyl, aryl or aralkyl radicals, while X represents the halogen.

Examples of such compounds are trimethyl benzyl-ammonium chloride, triethyl benzyl-ammonium chloride.

The quaternary ammonium salts described are present in the compositions here proposed in quantities of from 500 to 2,00 p.p.m. for preference.

The compounds decomposing in light which can be used for the purposes of this invention, are those having the general formula:

in which X stands for the halogen, preferably chlorine, while R represents an alkyl, phenyl, aralkyl, naphthyl or alkyl-naphthyl radical.

Examples of compounds of this type are: 2-naphthalene sulphonyl chloride, p-toluene sulphonyl chloride and benzene sulphonyl chloride.

The sulphonyl halides mentioned are added to the unsaturated polyester compositions here proposed in quantities of from 0.1 percent to 4.0 percent by weight for preference.

the method by which the light-sensitive substances are added to the unsaturated polyester containing the stabilizing system is not critical, but even indirect light should be excluded in any case.

In particular, the light-sensitive agent may be added to the unsaturated polyester while agitation is maintained, at a temperature of about 40° C. to 50° C., until solution is complete.

The unsaturated polyester compositions here proposed are stable while stored for periods of over 4 months and even over 5 months and produce tough brilliant well-hardened goods when irradiated with light having more particularly a wavelength of from 2,500 to 4,000A.

In particular, these compositions are also stable in the presence of metallic accelerators (cobalt salts, for instance, such as cobalt naphthenate, cobalt octoate and cobalt thallate), which may be added for the purpose of promoting hardening in depth, as, for example, where the resin composition is applied to a porous substrate or hardened in relatively large thicknesses (exceeding 200 microns).

The procedure adopted in the experimental examples given hereunder was as follows:

A flask equipped with agitation and cooling means, a thermometer and means for the injection of inert gas was charged with reagents consisting of propylene glycol, fumaric acid and phthalic anhydride.

Organic phosphite was also added, in quantities as already specified.

Then heat was applied while nitrogen was caused to flow, the temperature being raised gradually to about 160° C., with the agitator running.

Next, the temperature was raised by 5° C. every hour to a level of 200° to 205° C., this being maintained until the reaction product had a Gardner viscosity of between U and V, ascertained in a solution containing 66 percent by weight of styrene.

The whole was then cooled to about 150° C. and hydroquinone and the quaternary ammonium salt were added.

Dilution with styrene was carried out at a temperature of 90° to 100° C., to bring the styrene content of the composition to approximately 65 percent by weight.

The light-sensitive substance, taken from the group of compounds already referred to, was added to the unsaturated polyester at a temperature of 40° C. to 50° C., agitation being maintained until solution was complete.

Stability tests on the unsaturated polyester compositions were made by placing specimens in a temperature-controlled atmosphere at 64°±1° C.

Every day of stability at that temperature is equivalent to 1 month of stability of the said specimens when kept in the dark, out of contact with peroxides, at ambient temperature (approx, 20° C.).

During the hardening of the unsaturated polyester compositions, the specimens, in the form of film, were irradiated with ultraviolet light produced by a 125W upright lamp of 5720B/00 (Philips) type.

The thickness of the film, stretched over a sheet of glass, was maintained in all cases at a constant value of 200 microns.

The film was exposed to the action of the light at a constant distance of 10 cm. for a period of 5 minutes and then for a further 5 minutes after the test piece had been rotated to a position at 90 to the first.

Thirty minutes after the end of irradiation, the hardness of the specimen was measured by Koening pendulum.

EXAMPLE 1

The procedure described was adopted, with the polycondensation of:

2.45 mols of propylene glycol
1.25 mols of fumaric acid
1.50 mols of phthalic anhydride to which triphenyl phosphite was added in a quantity such as to bring the content thereof in the polyester composition to about 500 p.p.m.

Condensation was continued until the acid No. was 45.

Upon the completion of reaction, cooling to 150° C. was applied, hydroquinone (50 p.p.m. and trimethylbenzyl-ammonium chloride (800 p.p.m. related to the final composition) were added and then dilution with styrene was carried out at approx. 90° C. until the content thereof in the composition was 65 percent by weight.

Finally, 2-naphthyl sulphonyl chloride, to the extent of 1 percent by weight, was added at 40° C.

When hardened as described in this specification, the result, was a brilliant film having a hardness of 120 inch measured by Koening pendulum.

2 the composition had a stability of more than 4 months at 20° C.

EXAMPLE 2 polycondensation of the following was carried out as in example b 1:

2.10 mols of propylene gylcol 1.00 of fumaric acid 39.
1.00 mol of phthalic anhydride.

On completion of condensation, the product had a acid No. of 39.

The composition obtained by following the same procedure as in example 1 had a stability at 20° C. of more than 5 months and hardened to form a brilliant film with a hardness of 10 inch measured by koening pendulum.

EXAMPLE 3

Polycondensation of the following was carried out as in example 1:

1.76 mols of propylene glycol
0.67 mol of fumaric acid
1.00 mol of phthalic anhydride.

On completion of condensation, the product had an acid No. of 36.

The composition obtained by the same procedure as in example 1 had a stability at 20° C. of more than 5 months and hardened to form a brilliant film with a hardness of 95 inch measured by Koening pendulum.

We claim:

1. Stable, photochemically hardenable unsaturated polyester compositions containing a. An unsaturated polyester consisting of ($i$ an unsaturated vinyl monomer and in combination (ii) a polycondensation product of a polycarboxylic acid and a polyhydroxyl alcohol the acid or the alcohol being nonaromatically unsaturated, and b. a stabilizing system consisting of an alkyl phosphite or aryl phosphite, a quaternary ammonium salt and a light-sensitive substance of the general formula R-SO$_2$X, in which X stands for a halogen and R represents an alkyl, phenyl, aralkyl, naphthyl or alkyl-naphthyl radical.

2. Compositions as in claim 1, in which the unsaturated monomer is styrene.

3. Compositions as in claim 1, in which the unsaturated monomer is present to the extent of 20 PERCENT to 70 percent by weight.

4. Compositions as in claim 1, in which the phosphite is selected from the group consisting of trimethyl phosphite, triethyl phosphite and triphenyl phosphite.

5. Compositions as in claim 1, in which the phosphite is present to the extent of 100 to 1,000 p.p.m.

6. Compositions as in claim 1, in which the quaternary ammonium salt is present to the extent of 500 to 2,000 p.p.m.

7. Compositions as in claim 1, in which the light-senstive compounds are present to the extent of 0.1 percent to 4.1 percent by 8. Hardened polyester compositions made by irradiation of the compositions of claim 1 with light having a wavelength of 2,500 to 4,000 A.

9. Process of irradiating the hardenable polyester composition of claim 1 by subjecting said composition to light of wavelenght of 2,500 to 4,000A.

* * * * *